(12) United States Patent
Ma et al.

(10) Patent No.: US 7,895,148 B2
(45) Date of Patent: Feb. 22, 2011

(54) CLASSIFYING FUNCTIONS OF WEB BLOCKS BASED ON LINGUISTIC FEATURES

(75) Inventors: Wei-Ying Ma, Beijing (CN); Xiangye Xiao, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 11/742,283

(22) Filed: Apr. 30, 2007

(65) Prior Publication Data

US 2008/0270334 A1    Oct. 30, 2008

(51) Int. Cl.
G06N 5/00    (2006.01)

(52) U.S. Cl. .......................................... 706/55; 706/45

(58) Field of Classification Search .................... 706/55, 706/45, 10; 707/10
See application file for complete search history.

(56) References Cited

U.S. PATENT DOCUMENTS

| | | | |
|---|---|---|---|
| 5,848,184 A | 12/1998 | Taylor et al. | |
| 6,026,409 A | 2/2000 | Blumenthal | |
| 6,088,710 A | 7/2000 | Dreyer et al. | |
| 6,345,279 B1 | 2/2002 | Li et al. | |
| 6,970,602 B1 | 11/2005 | Smith et al. | |
| 7,058,633 B1 * | 6/2006 | Gnagy et al. | 707/10 |
| 7,131,063 B2 | 10/2006 | Mateos | |
| 7,322,007 B2 | 1/2008 | Schowtka et al. | |
| 7,401,079 B2 | 7/2008 | Itoh et al. | |
| 7,428,700 B2 | 9/2008 | Wen et al. | |
| 7,607,082 B2 | 10/2009 | Xie et al. | |
| 2001/0034740 A1 | 10/2001 | Kerne | |
| 2002/0029246 A1 | 3/2002 | Kumagai | |
| 2002/0059166 A1 | 5/2002 | Wang et al. | |
| 2002/0083096 A1 | 6/2002 | Hsu et al. | |
| 2002/0156807 A1 | 10/2002 | Dieberger | |
| 2003/0101412 A1 | 5/2003 | Eid | |
| 2003/0237053 A1 | 12/2003 | Chen et al. | |
| 2004/0146199 A1 | 7/2004 | Berkner et al. | |
| 2004/0237030 A1 | 11/2004 | Malkin | |
| 2005/0066269 A1 | 3/2005 | Wang et al. | |
| 2005/0125725 A1 | 6/2005 | Gatt | |
| 2005/0246296 A1 | 11/2005 | Ma et al. | |

(Continued)

FOREIGN PATENT DOCUMENTS

WO    WO-2006093394    9/2006

OTHER PUBLICATIONS

Shih, et al., Learning Classes Correlated to a Hierarchy, A. I. Lab, Massachusetts Institute of Technology, 2003, pp. 1-14.*

(Continued)

*Primary Examiner*—Wilbert L Starks, Jr.
(74) *Attorney, Agent, or Firm*—Perkins Coie LLP

(57) ABSTRACT

A classification system trains a classifier to classify blocks of the web page into various classifications of the function of the block. The classification system trains a classifier using training web pages. To train a classifier, the classification system identifies the blocks of the training web pages, generates feature vectors for the blocks that include a linguistic feature, and inputs classification labels for each block. The classification system learns the coefficients of the classifier using any of a variety of machine learning techniques. The classification system can then use the classifier to classify blocks of web pages.

19 Claims, 5 Drawing Sheets

U.S. PATENT DOCUMENTS

| | | | |
|---|---|---|---|
| 2005/0289133 | A1 | 12/2005 | Arrouye et al. |
| 2006/0031202 | A1 | 2/2006 | Chang et al. |
| 2006/0107205 | A1 | 5/2006 | Makela |
| 2006/0123042 | A1 | 6/2006 | Xie et al. |
| 2006/0149726 | A1 | 7/2006 | Ziegert et al. |
| 2006/0150094 | A1 | 7/2006 | Patrawala |
| 2006/0282758 | A1 | 12/2006 | Simons et al. |
| 2006/0294199 | A1 | 12/2006 | Bertholf |

OTHER PUBLICATIONS

Lanquillon, C., Enhancing text classification to improve information filtering, Ph.D. Thesis, Otto-von-Guericke-Universität Magdeburg, Germany, 2001, pp. 1-217.*

Lanquillon, C., Enhancing text classification to improve information filtering, Ph.D. Thesis, Otto-von-Guericke-Universitat Magdeburg, Germany, 2001, pp. 1-217.*

Chen, et al. "Function-Based Object Model Towards Website Adaptation", in *WWW '01: Proceedings of the tenth international conference on World Wide Web*, pp. 587-596, New York, NY, USA, 2001. ACM Press.

Debnath, et al. "Automatic Extraction of Informative Blocks from Webpages", In *SAC '05, Proceedings of the 2005 ACM Symposium on Applied Computing*, pp. 1722-1726, New York, NY, USA, 2005. ACM Press.

Debnath, et al. "Automatic Identification of Informative Sections of Web Pages", *IEE Transactions on Knowledge and Data Engineering*, vol. 17, No. 9, Sep. 2005. pp. 1233-1246.

Lin, et al. "Discovering Informative Content Blocks from Web Documents", In *Proceedings of the ACM SIGKDD International Conference on Knowledge Discovery and Data Mining*, pp. 588-593, Edmonton, Alberta, Canada, Jul. 2002.

Song, et al. "Learning Block Importance Models for Web Pages", In *WWW '04: Proceedings of the 13th international conference on World Wide Web*, pp. 203-211, New York, NY, USA, 2004. ACM Press.

Song, et al. "Learning Important Models for Web Page Blocks based on Layout and Content Analysis", *SIGKDD Explor. Newsl.*, 6(2): 14-23, 2004.

Tongchim, et al. "Classification of News Web Documents Based on Structural Features", Copyright Springer-Verlag Berlin Heidelberg 2006 (8 pages).

Xiao, et al. "A comparative study on classifying the functions of web page blocks", *Proceedings of the Fifteenth International Conference on Information and Knowledge Management (CIKM2006)*, Nov. 6-11, 2006, Arlington, VA, USA.

Xiao, et al. "Classifying Web Page Block Functions Through Combining Layout and Non-Layout Features", *WWW 2007*, May 8-12, 2007, Banff, California.

Yi, et al. "Eliminating Noisy Information in Web Pages for Data Mining", *KDD '03: Proceedings of the Ninth ACM SIGKDD International Conference on Knowlege Discovery and Data Mining*, pp. 296-305, New York, NY, USA, 2003. ACM Press.

Yin, et al. "Understanding the Fucntion of Web Elements for Mobile Content Delivery Using Random Walk Models," WWW (Special Interest Tracks and Posters) 2005, 2005.

Rekimoto, Jun, et al, "Data.Tiles: A Modular Platform for Mixed Physical and Graphical Interactions," CHI '01: Proceedings of the SIGCHI Conference on Human Factors in Computing Systems, Mar. 2001, pp. 269-276.

Bjork, et al., "West: A Web Browser for Small Terminals," 1999, pp. 77-103.

Buyukkoten, et al., "Accordion Summarization for End-Game Browsing on PDAs and Cellular Phones," ACM, vol. 3, No. 1, 2001, pp. 213-220.

Chen, Yu et al. "Adapting Web Pages for Small-Screen Devices," IEEE Internet Computing, Jan.-Feb. 2005, 7 pages.

Gravano, Luis et al. "Categorizing Web Queries According to Geographical Locality," CIKM 2003, 9 pages.

Wang, Lee et al. "Detecting Dominant Locations from Search Queries," SIGIR 2005, 8 pages.

Gupta, Suhit et al. "DOM-based Content Extraction of HTML Documents," May 2003, 10 pages.

Buyukkoten, Orkut et al. "Focused Web Searching with PDAs," 2000, 20 pages.

Buyukkoten, Orkut et al, "Power Browser: Efficient Web Browsing for PDAs," 8 pages.

Wen, Ji-Rong et al. "Probabilistic Model for Contextual Retrieval," Jul. 2004, 7 pages.

Milic-Frayling, Natasa et al. "SearchMobil: WebViewing and Search for Mobile Devices," May 2003, 8 pages.

Jones, Matt et al. "Sorting out Searching on Small Screen Devices," 2002, 15 pages.

Yin, Xinyi et al. "Understanding the Function of Web Elements for Mobile Content Delivery Using Random Walk Models", May 2005, 2 pages.

Jones, Steve et al. "Using keyphrases as search result surrogates on small screen devices," Feb. 3, 2004, 14 pages.

Cai, Deng et al. "VIPS: a Vision-based Page Segmentation Algorithm," Nov. 1, 2003, 29 pages.

Wobbrock, Jacob et al. "WebThumb: Interaction Techniques for Small-Screen Browsers," 2002, 4 pages.

Teo, Lawrence et al. "Constraint-Based Document Layout for Mobile Computers," Jan. 26, 2001, 16 pages.

Schneiderman, "Tree Visualization with Tree Maps: 2-d Space-Filing Approach," ACM Transactions on Graphics, vol. 11, No. 1, Jan. 1992, pp. 92-99.

West et al., "A Web Browser for Small Terminals," ACM Symposium on User Interface Software Technology, 1999, pp. 187-196.

Zhou, GuoDong et al., "Named Entity Recognition using an HMM-based Chunk Tagger," 40th ACL, Jul. 2002.

Jones, Matt et al., "Using a Mobile Device to Vary the Pace of Search," In Proceedings of Human-Computer Interaction with Mobile Devices and Services, 2003, 5 pages.

Kovacevic, Milos et al., "Recognition of Common Areas in a Web Page Using Visual Information: a Possible Application in a Page Classification," In the Proceedings of 2002 IEEE International Conference on Data Mining, pp. 1-8.

Ma, Qiang et al., "A Localness-Filter for Searched Web Pages," APWeb 2003, LNCS 2642, pp. 525-536.

Xie, Xing et al., "An Adaptive Web Page Layout Structure for Small Devices," Multimedia Systems 2005, pp. 34-44.

* cited by examiner

CLASSIFYING FUNCTIONS OF WEB BLOCKS BASED ON LINGUISTIC FEATURES

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Whether the web pages of a search result are of interest to a user depends, in large part, on how well the keywords identified by the search engine service represent the primary topic of a web page. Because a web page may contain many different types of information, it may be difficult to discern the primary topic of a web page. For example, many web pages contain advertisements that are unrelated to the primary topic of the web page. A web page from a news web site may contain an article relating to an international political event and may contain "noise information" such as an advertisement for a popular diet, an area related to legal notices, and a navigation bar. It has been traditionally very difficult for a search engine service to identify what information on a web page is noise information and what information relates to the primary topic of the web page. As a result, a search engine service may select keywords based on noise information, rather than the primary topic of the web page. For example, a search engine service may map a web page that contains a diet advertisement to the keyword "diet," even though the primary topic of the web page relates to an international political event. When a user then submits a search request that includes the search term "diet," the search engine service may return the web page that contains the diet advertisement, which is unlikely to be of interest to the user.

Many information retrieval and mining applications, such as search engine services as described above, depend in part on the ability to divide a web page into blocks and classify the functions of the blocks. These applications include classification, clustering, topic extraction, content summarization, and ranking of web pages. The classification of the function of a block can also be used in fragment-based caching in which caching policies are based on individual fragments. The classification of the function of blocks can also be used to highlight blocks that may be of interest to users. The classification of the function of blocks is particularly useful when a web page is displayed on a screen with a small size, such as that of a mobile device.

SUMMARY

A method and system for classifying blocks of a web document based on linguistic features is provided. A classification system trains a classifier to classify blocks of the web page into various classifications of the function of the block. These classifications may include an information classification and a non-information classification. The classification system trains a classifier using training web pages. To train a classifier, the classification system identifies the blocks of the training web pages, generates feature vectors for the blocks that include a linguistic feature, and inputs classification labels for each block. The classification system learns the coefficients of the classifier using any of a variety of machine learning techniques. The classification system can then use the classifier to classify blocks of web pages. To classify the blocks of a web page, the classification system identifies the blocks of the web page and generates a feature vector for each block. The classification system then applies the classifier to the feature vector of a block to generate a classification of the block.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
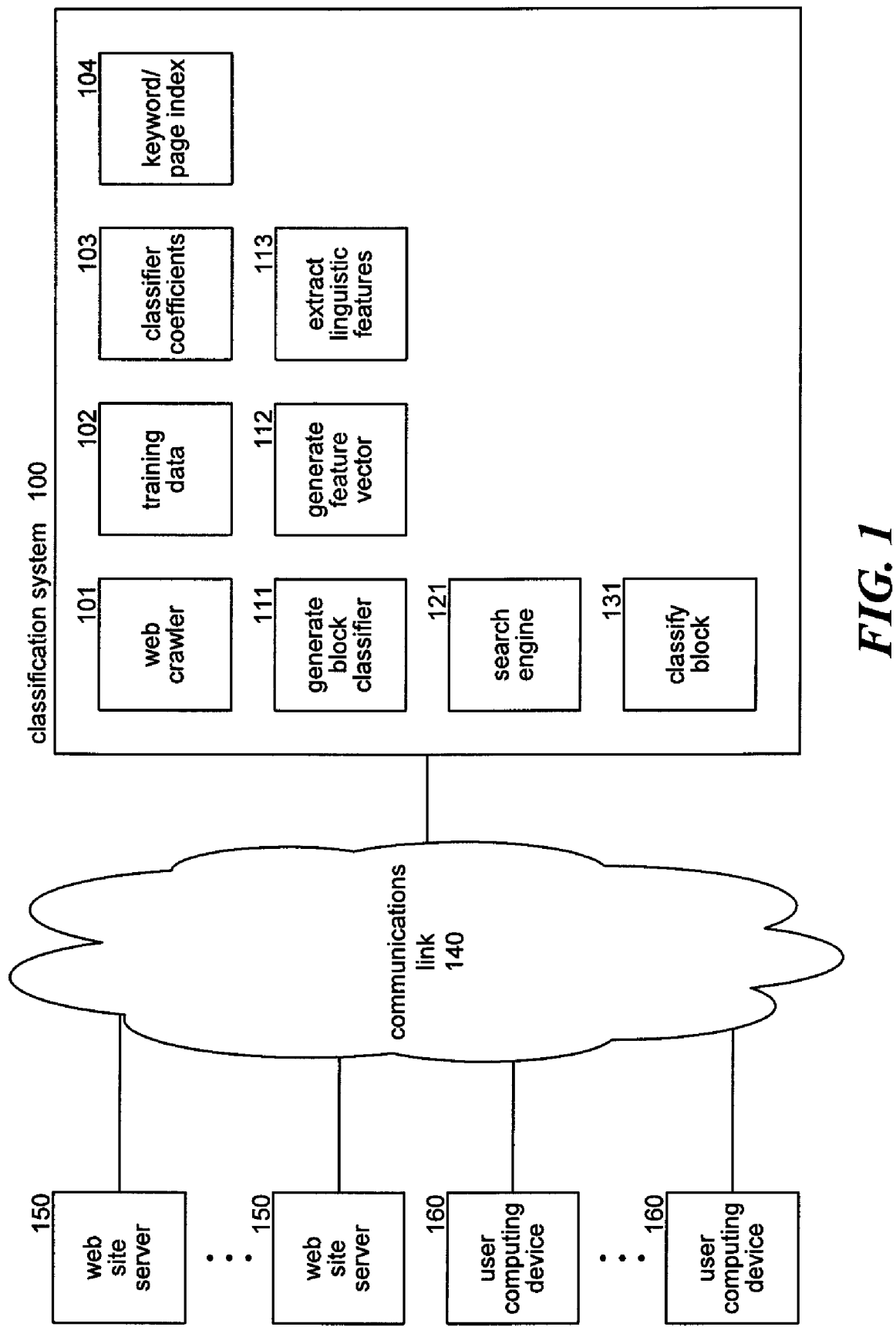
FIG. 1 is a block diagram illustrating components of the classification system in one embodiment.

A method and system for classifying blocks of a web document based on linguistic features is provided. In some embodiments, a classification system trains a classifier to classify blocks of the web page into various classifications of the function of the block. These classifications may include an information classification and a non-information classification. An information classification may indicate that a block relates to the primary topic of the web page, and a non-information classification may indicate that the block contains noise information such as an advertisement. The classification system trains a classifier using training web pages. To train a classifier, the classification system identifies the blocks of the training web pages, generates feature vectors for the blocks, and inputs classification labels for each block. For example, the feature vector of a block may include linguistic features based on the parts of speech or the capitalization of the words within the text of the block. The feature vector of a block may also include layout features such as size of the block, position of the block within the web page, and so on. The classification system learns the coefficients of the classifier using any of a variety of machine learning techniques such as a support vector machine or linear regression. The classification system can then use the classifier to classify blocks of web pages. To classify the blocks of a web page, the classification system identifies the blocks of the web page and generates a feature vector for each block. The classification system then applies the classifier to the feature vector of a block to generate a classification of the block.

The classification system uses linguistic features to help classify the function of a block because developers of web pages tend to use different linguistic features within blocks having different functions. For example, a block with a navigation function will likely have very short phrases with no sentences. In contrast, a block with a function of providing the text of the primary topic of a web page will likely have complex sentences. Also, a block that is directed to the primary topic of a web page may have named entities, such as persons, locations, and organizations. In addition to linguistic features, the classification system may use term features in recognition that certain terms occur in blocks with certain functions. For example, a block with the terms copyright, privacy, rights, reserved, and so on may be a block with a copyright notice function. A block with the terms sponsored link, ad, or advertisement may have an advertisement function. The linguistic features and term features may be considered to be non-layout features. One skilled in the art will appreciate that the classification system can use any combination of layout and non-layout features depending on the classification objectives of the system.

The classification system may be used to classify web pages based on any hierarchical or non-hierarchical of classifications with any number of classifications. For example, the classification system may use two classifications to classify web pages as having a certain function (e.g., information) or not (e.g., noise). As another example, the classification system may use five classifications: information, interaction, navigation, advertisement, and other. The information classification indicates that the content of the block is related to the primary topic of the web page. The interaction classification indicates that the block is an area of the web page for a user to interact, such as an input field for a user query or for information submission. The navigation classification indicates that the content of the block provides a navigation guide to the user, such as a navigation bar or a content index. The advertisement classification indicates that the content of the block is an advertisement. The other classification indicates that the block has none of the other functions. The other classification may include copyright blocks, contact blocks, decoration blocks, and so on.

In some embodiments, a classification system may use layout features that can be categorized as spatial features, presentation features, tag features, and hyperlink features. The spatial features relate to the size and location of a block within the web page. For example, copyright block may typically be located at the lower portion of a web page. The presentation features relate to how the content of the block is presented. For example, a presentation features may include font size, number of images in a block, number of words within a block, and so on. The tag features indicate the types of tags used in the markup language describing the block. For example, the tags' form and input may indicate that the function of the block is interaction. The hyperlink features may indicate that the block is a navigation block. Various layout features used by the classification system are described in Table 1.

TABLE 1

Layout Features
Category spatial features:

1. x and y coordinates of the center point of a block/page
2. width and height of a block/page presentation features:

1. maximum font size of the inner text in a block/page
2. maximum font weight of the inner text in a block/page
3. number of words in the inner text in a block/page
4. number of words in the anchor text in a block/page
5. number of images in a block/page
6. total size of images in pixels in a block/page
7. total size of form fields in pixels in a block/page tag features:

1. number of form and input tags in a block/page:
   <form>, <input>, <option>, <selection>, etc.
2. number of table tags in a block/page:
   <table>, <tr>, <td>
3. number of paragraph tags in a block/page: <p>
4. number of list tags in a block/page:
   <li>, <dd>, <dt>
5. number of heading tags in a block/page:
   <h1>, <h2>, <h1> hyperlink features:

1. total number of hyperlinks in a block/page
2. number of intrasite hyperlinks in a block/page
3. number of inter-site hyperlinks in a block/page
4. number of hyperlinks on anchor text in a block/page
5. number of hyperlinks on images in a block/page In some embodiments, the linguistic features may include parts-of-speech features, named entity features, symbolic features, and capitalization features. To generate the linguistic features, the classification system may extract the text of a block and submit it to a natural language processor. The natural language processor tags each word of the text with its parts of speech. The parts of speech may include various forms of nouns, pronouns, verbs, adjectives, and adverbs. The parts of speech may include wh-determiners, wh-pronouns, and wh-adverbs. The parts of speech may also include other determiners, existential there, foreign words, to, modal, and coordinating, prepositional and subordinating conjunctions. The classification system may generate a count of the occurrence of each part of speech within the text of a block. For sample, a block may have 10 nouns, 5 verbs, 7 adjectives, 3 wh-pronouns, and 2 prepositional conjunctions. Each count represents a linguistic feature used in the feature vector for the block.

The named entity features may include persons, locations, and organizations. For example, named entities may include Bill Gates, Redmond, and Microsoft. The classification system may use any of the variety of named entity recognizers. (See, Zhou, G. and Su, J, "Named-Entity Recognition using an HMM-based Chunk Tagger," Proceedings of ACL '02, pp. 473-480, 2002.)

The symbolic features can be categorized into punctuation and non-punctuation. The punctuation symbols include an exclamation point, a question mark, a comma, a colon, a semi-colon, an ellipsis, a hyphen, a single open quote, a single close quote, a double open quote, a double close quote, an open parenthesis, and a close parenthesis. The non-punctuation symbols may include an octothorp, a currency symbol, an at sign, a vertical bar, an ampersand, an asterisk, a plus sign, and so on.

The classifier, once learned, can be used to improve the accuracy of a wide range of applications whose results depend on discerning functions of blocks of a web page. A search engine service may use the classifier to calculate relevance of web pages of a search result to the search request. After the search result is obtained, the search engine service may use the classifier to identify an information block of each web page and calculate a relevance of the information block (or group of information blocks) to the search request. Because this relevance is based on the information block of the web page, it may be a more accurate measure of relevance than a relevance that is based on the overall information of the web page, which may include noise information.

A search engine service may also use the classifier to identify web pages that are related to a certain web page. The search engine service may use the classifier to identify the information blocks of that web page and then formulate a search request based on the text of the identified block. The search engine service may perform a search using that formulated search request to identify web pages that are related to that certain web page.

A search engine service may also use the classifier to classify web pages. For example, web pages may be classified based on their primary topic. The search engine service may use the classifier to identify information blocks of a web page and then classify the web page based on the text of the identified blocks.

A web browser may also use the classifier to identify advertisements of a web page to be omitted when the entire content of the web page cannot fit on a display device. For example, devices such as cell phones or personal digital assistants may have very small displays on which most web pages cannot reasonably be displayed because of the amount, size, and complexity of the information of the web page. A web page is not reasonably displayed when the content is so small that it cannot be effectively viewed by a person. When such a device is used to browse web pages, the classifier may be used to identify advertisement blocks of a web page and to display only other blocks on the small display. Alternatively, a web browser may rearrange the blocks of a web page, highlight blocks of a web page, remove blocks of a web page, and so on based on the functions of the blocks as indicated by the classifier.

The classification system can identify the blocks of a web page using various segmentation techniques such as a document object model-based ("DOM-based") segmentation algorithm, a location-based segmentation algorithm, a vision-based segmentation algorithm, and so on. A DOM-based segmentation algorithm may use the HTML hierarchy of a web page to identify its various blocks. A location-based segmentation algorithm attempts to identify areas of a web page that may be considered a unit based on physical characteristics of the areas. A vision-based segmentation algorithm is described in U.S. patent application Ser. No. 10/628,766, entitled "Vision-Based Document Segmentation," filed on Jul. 28, 2003, now, U.S. Pat. No. 7,428,700 issued Sep. 23, 2008, which is hereby incorporated by reference. That vision-based segmentation algorithm identifies blocks based on the coherency of the information content of each block. For example, an advertisement for a diet may represent a single block because its content is directed to a single topic and thus has a high coherency. An area of a display page that includes many different topics may be divided into many different blocks.

The classification system may use various techniques to learn the classifier from the feature vectors representing the blocks and the user-specified classification of the blocks. For example, as described below in more detail, the classification system may learn the classifier using a neural network or a support vector machine.

In one embodiment, the classification system learns a block classifier by minimizing a least squares objective function based on the user-specified classification of blocks of a collection of web pages. Each block can be represented by a feature vector and classification pair (x, y) where x is the feature vector of the block and y is its classification. The set of feature vector and classification pairs of the collection of web pages is referred to as a training set T. The classification system attempts to learn a classifier $f$ that minimizes the following objective function:

$$\Sigma_{(x,y) \in T} |f(x) - y|^2 \qquad (1)$$

The objective function can be solved using classification techniques such as a support vector machine if y is discrete and regression techniques such as a neural network if y is continuous.

When the classification is represented by continuous real numbers, the classification system may apply a neural network learning for learning the optimal $f^*$ which is given by minimizing the following objective function:

$$f* = \arg\min_{f} \sum_{i=1}^{m} \|f(x_i) - y_i\|^2 \qquad (2)$$

where m is the number of blocks in the training set. This is a multivariate non-parametric regression problem, since there is no a priori knowledge about the form of the true regression function that is being estimated.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system uses a radial basis function ("RBF") network and a standard gradient descent as the search technique.

The classification system constructs an RBF network with three layers having different roles. The input layer comprises source nodes (i.e., sensory units) that connect the network to its environment (i.e., low-level feature space). The hidden layer applies a nonlinear transformation from the input space to the hidden space. Generally, the hidden space is of high dimensionality. The hidden layer has RBF neurons, which calculate the input of the hidden layer by combining weighted inputs and biases. The output layer is linear and supplies the block classification given the low-level block representation applied to the input layer.

The function learned by RBF networks can be represented by the following:

$$f_i(x) = \sum_{j=1}^{k} \omega_{ij} G_i(x) \qquad (3)$$

where i is a block in the training set, h is the number of hidden layer neurons, $\omega_{ij} \in R$ are the weights, and $G_i$ is the radial function defined as follows:

$$G_i(x) = \exp\left(-\frac{\|x - c_i\|^2}{\sigma_i^2}\right) \quad (4)$$

where $c_i$ is the center for $G_i$ and $\sigma_i$ is the basis function width. The k-dimensional mapping can be represented as follows:

$$x \to f(x) = (f_1(x), f_2(x), \ldots, f_k(x)) \quad (5)$$

where $f = [f_1, f_2, \ldots, f_k]$ is the mapping function.

The RBF neural network approximates the optimal regression function from feature space to block classification. The classification system can train the RBF neural network off-line with the training samples $\{x_i, y_i\}$ (i=1, . . . , m) of the training set T. For a new block previously unprocessed, the classification system can calculate its classification using the regression function $f$ given the feature vector of the block.

When the classification is represented by discrete numbers, the classification system applies a support vector machine for learning the classifier. A support vector machine attempts to minimize structural risk, rather than empirical risk. The support vector machine may use a binary classification such that the training set is defined by the following:

$$D = \{x_i, y_i\}_{i=q}^{t} \quad (6)$$

where D is the training set, t is the number of training samples, and $y_i \in \{-1, 1\}$. The classification system attempts to select, among the infinite number of linear classifiers that separate the data, the one with the minimum generalization error. A hyperplane with this property is the one that leaves the maximum margin between the two classes. The classifier may be represented by the following:

$$f(x) = \text{sign}\left(\sum_{i=1}^{t} \alpha_i y_i \langle x_i, x \rangle - b\right) \quad (7)$$

where $\alpha_i$ associated with the training sample $x_i$ expresses the strength with which that point is embedded in the final function and b is the intercept also known as the bias in machine learning. A property of this representation is that often only a subset of the points will be associated with non-zero $\alpha_i$. These points are called support vectors and are the points that lie closest to the separating hyperplane. The nonlinear support vector machine maps the input variable into a high dimensional (often infinite dimensional) space, and applies the linear support vector machine in the space. Computationally, this can be achieved by the application of a (reproducing) kernel. The corresponding nonlinear decision function is represented as follows:

$$f(x) = \text{sign}\left(\sum_{i=1}^{t} \alpha_i y_i K(x_i, x) - b\right) \quad (8)$$

where K is the kernel function. Some typical kernel functions include a polynomial kernel, Gaussian RBF kernel, and sigmoid kernel. For a multi-class classification problem, the classification system can apply a one-against-all scheme.

FIG. 1 is a block diagram illustrating components of the classification system in one embodiment. The classification system 100 may be connected to web site servers 150 and user computing devices 160 via communications link 140. The classification system includes a web crawler component 101, a training data store 102, a classifier coefficients store 103, and a keyword/page index 104. The web crawler component crawls the web pages of the website servers, generates mappings of keywords to the web pages that contain those keywords, and stores the mapping in the keyword/page index. The web crawler may also collect web pages for use as training data that is stored in the training data store. The classifier coefficients store contains the coefficients of the trained classifier.

The classification system may also include a generate block classifier component 111, a generate feature vector component 112, and an extract linguistic features component 113. The generate block classifier component identifies blocks of the training web pages and invokes the generate feature vector component to generate feature vectors for each block. The generate feature vector component invokes the extract linguistic features component to generate the linguistic features for a block. The generate block classifier component also inputs a classification label for each block and trains the classifier using the feature vectors and the classification labels. The generate block classifier component stores the coefficients of the trained classifier in the classifier coefficients store. One skilled in the art will appreciate that the classifier may be trained using web pages of a single web site or web pages from multiple web sites. For example, an organization with a web site having thousands of web pages may train a classifier using a subset of its web pages. In such a case, the classifier likely will be more effective at classifying the blocks of the other web pages of the web site than a classifier trained using web pages from multiple web sites.

The classification system may also include a search engine 121, which is an example application that uses the classifier. The classification system includes a classify block component 131 that is invoked by the various applications. The classify block component is provided a web page and a block, generates a feature vector for the block, and applies the classifier to generate a classification for the block.

The computing device on which the classification system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the classification system, which means a computer-readable medium that contains the instructions. In addition, the instructions, data structures, and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the system may be implemented in and used by various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, separate computing systems may crawl the web to collect training data and train the classifier. Also, the applications that use the classifier may be hosted on a separate computing system.

Figure 2:
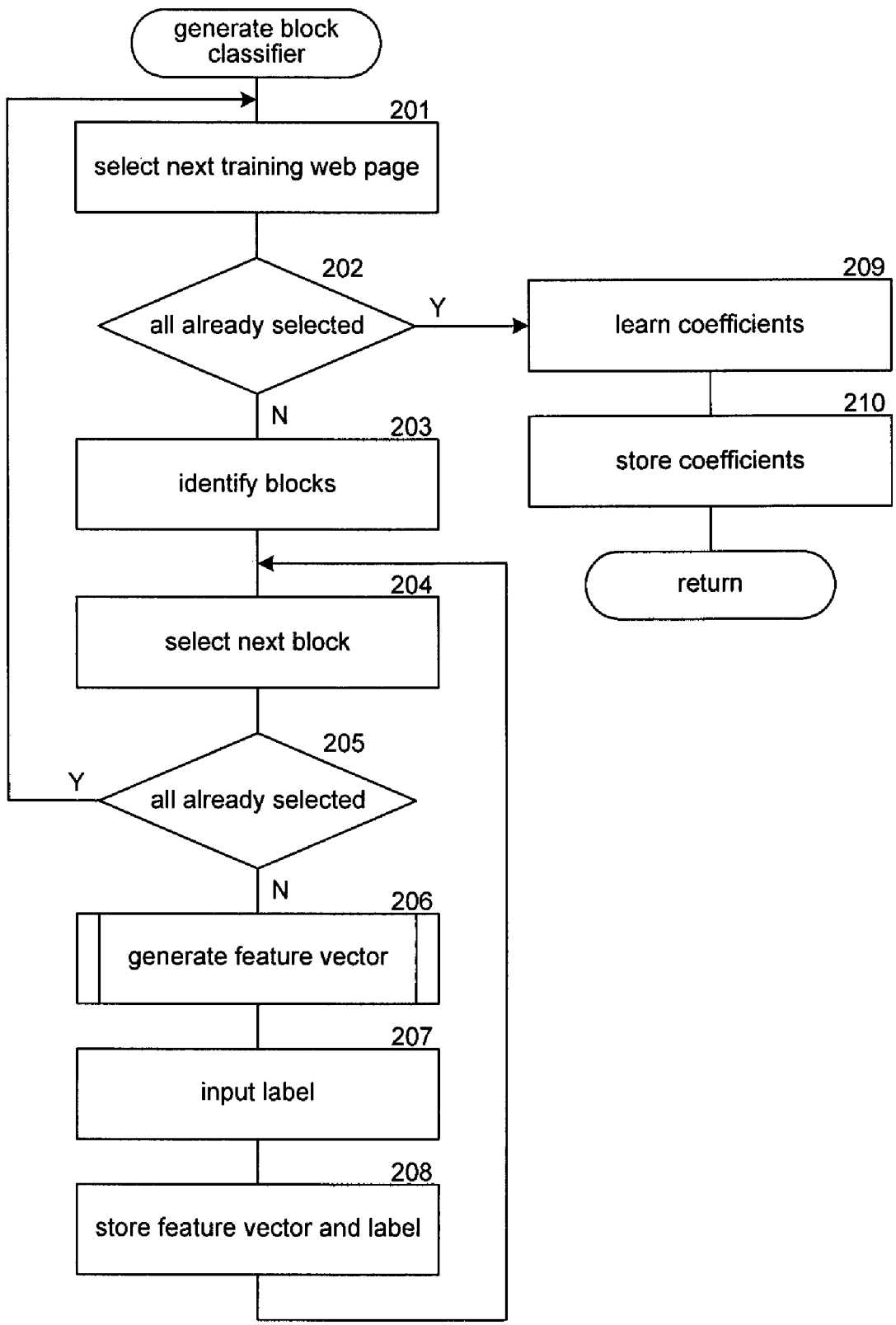
FIG. 2 is a flow diagram that illustrates the processing of the generate block classifier component of the classification system in one embodiment.

FIG. 2 is a flow diagram that illustrates the processing of the generate block classifier component of the classification system in one embodiment. In blocks 201-208, the component loops identifying the blocks of each training web page, generating its feature vector, and inputting its classification label. In block 201, the component selects the next training web page from the training data store. In decision block 202, if all the training web pages have already been selected, then the component continues at block 209, else the component continues at block 203. In block 203, the component identifies the blocks of the selected training web page. In block 204, the component selects the next block of the selected training web page. In decision block 205, if all the blocks have already been selected, then the component loops to block 201, else the component continues at block 206. In block 206, the component invokes the generate feature vector component to generate a feature vector for the selected block. In block 207, the component inputs a classification label for the selected block. In block 208, the component stores the feature vector and the classification label for use in training the classifier. The component then loops to block 204 to select the next block. In block 209, the component trains the classifier by learning the coefficients. In block 210, the component stores the coefficients in the classifier coefficients store and then returns.

Figure 3:
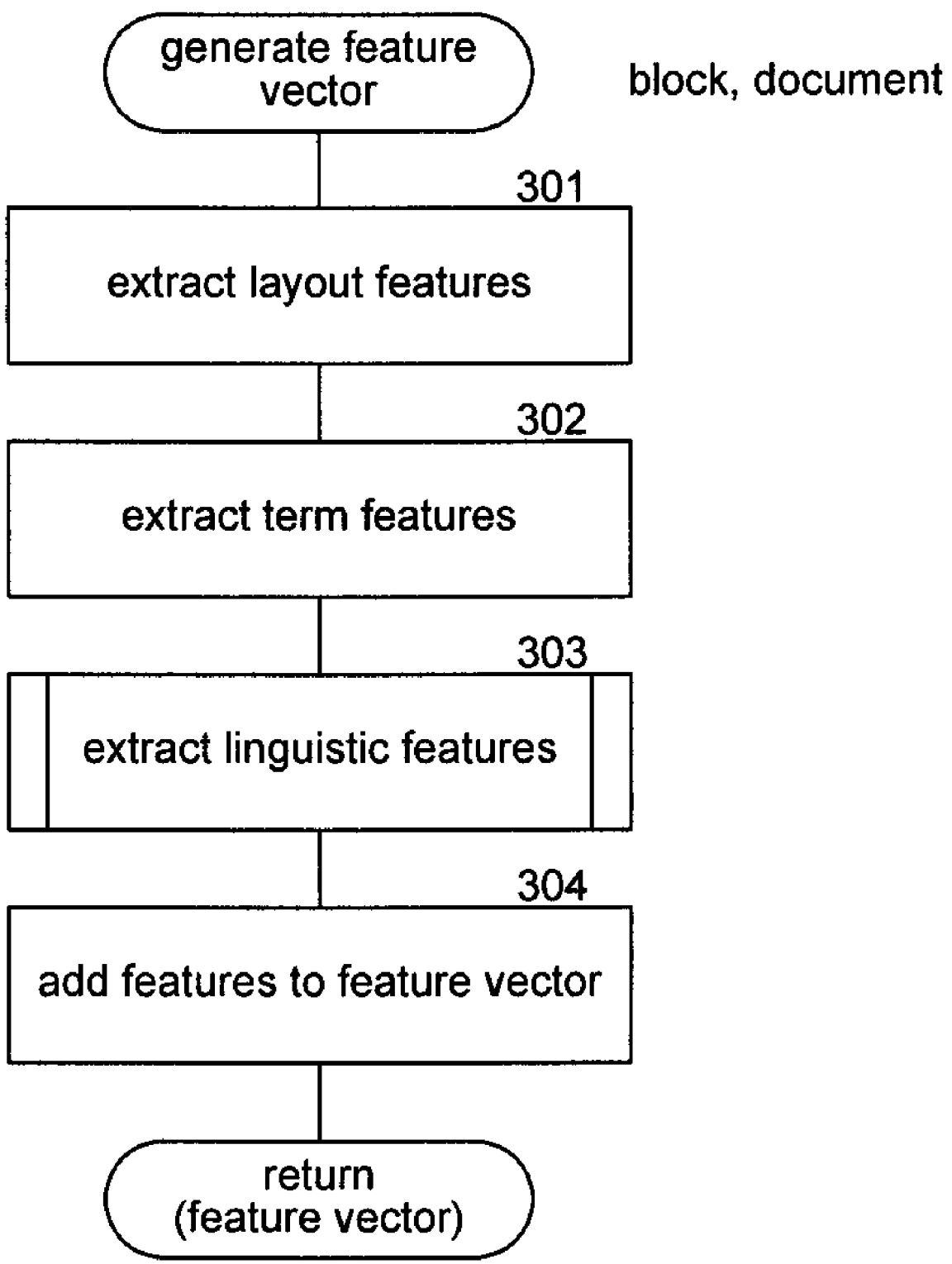
FIG. 3 is a flow diagram that illustrates the processing of the generate feature vector component of the classification system in one embodiment.

FIG. 3 is a flow diagram that illustrates the processing of the generate feature vector component of the classification system in one embodiment. The component generates layout and non-layout features for the feature vector of a block. The component is passed a block along with the web page that contains the block. In block 301, the component extracts the layout features of the block. In block 302, the component extracts the term features of the block. In block 303, the component invokes the extract linguistic features component to extract the linguistic features of the block. In block 304, the component adds the extracted features to the feature vector. The component then returns the feature vector.

Figure 4:
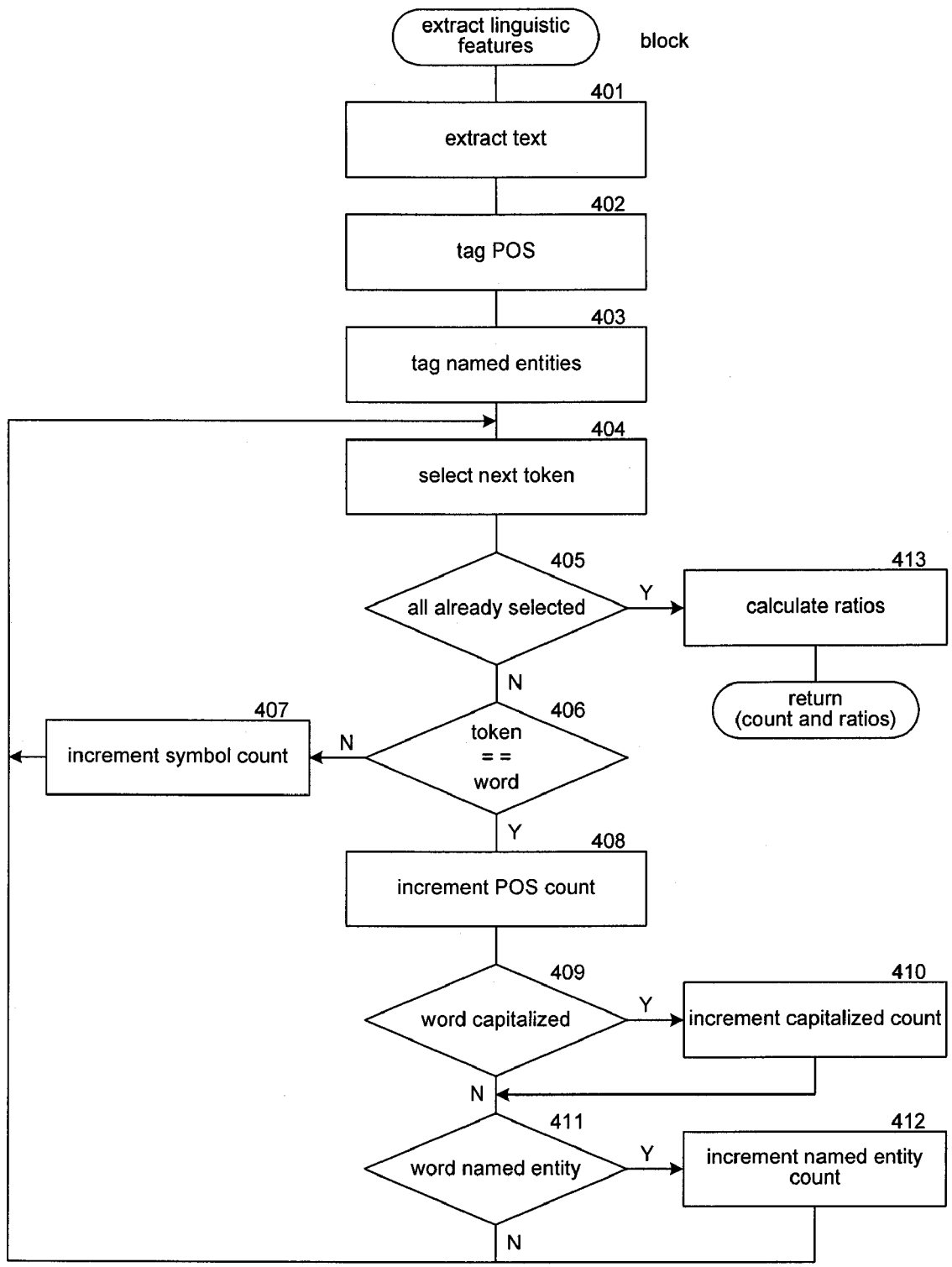
FIG. 4 is a flow diagram that illustrates the processing of the extract linguistic features component of the classification system in one embodiment.

FIG. 4 is a flow diagram that illustrates the processing of the extract linguistic features component of the classification system in one embodiment. The component is passed a block and returns its linguistic features. In block 401, the component extracts the text from the block. In block 402, the component tags the words of the text with their parts of speech. In block 403, the component tags the words of the texts that are named entities. In blocks 404-412, the component loops selecting each token (e.g., word or symbol) of the text and accumulates the information for generating the linguistic features. In block 404, the component selects the next token of the extracted text. In decision block 405, if the tokens have already been selected, then the component continues at block 413, else the component continues at block 406. In decision block 406, if the selected token is a word, then the component continues at block 408, else the component continues at block 407. In block 407, the component increments a count corresponding to the symbol of the token and then loops to block 404 to select the next token. In block 408, the component increments a count corresponding to the part of speech of the selected word. In decision block 409, if the word is capitalized, then the component continues at block 410, else the component continues at block 411. In block 410, the component increments a count of capitalized words. In decision block 411, if the word is a named entity, then the component continues at block 412, else the component loops to block 404 to select the next token. In block 412, the component increments a count corresponding to the type of named entity for the selected word and then loops to block 404 to select the next token. In block 413, the component calculates various ratios (e.g., ratio of the count of capitalized words to a count of all the words) used as features and then returns the counts and the ratios.

Figure 5:
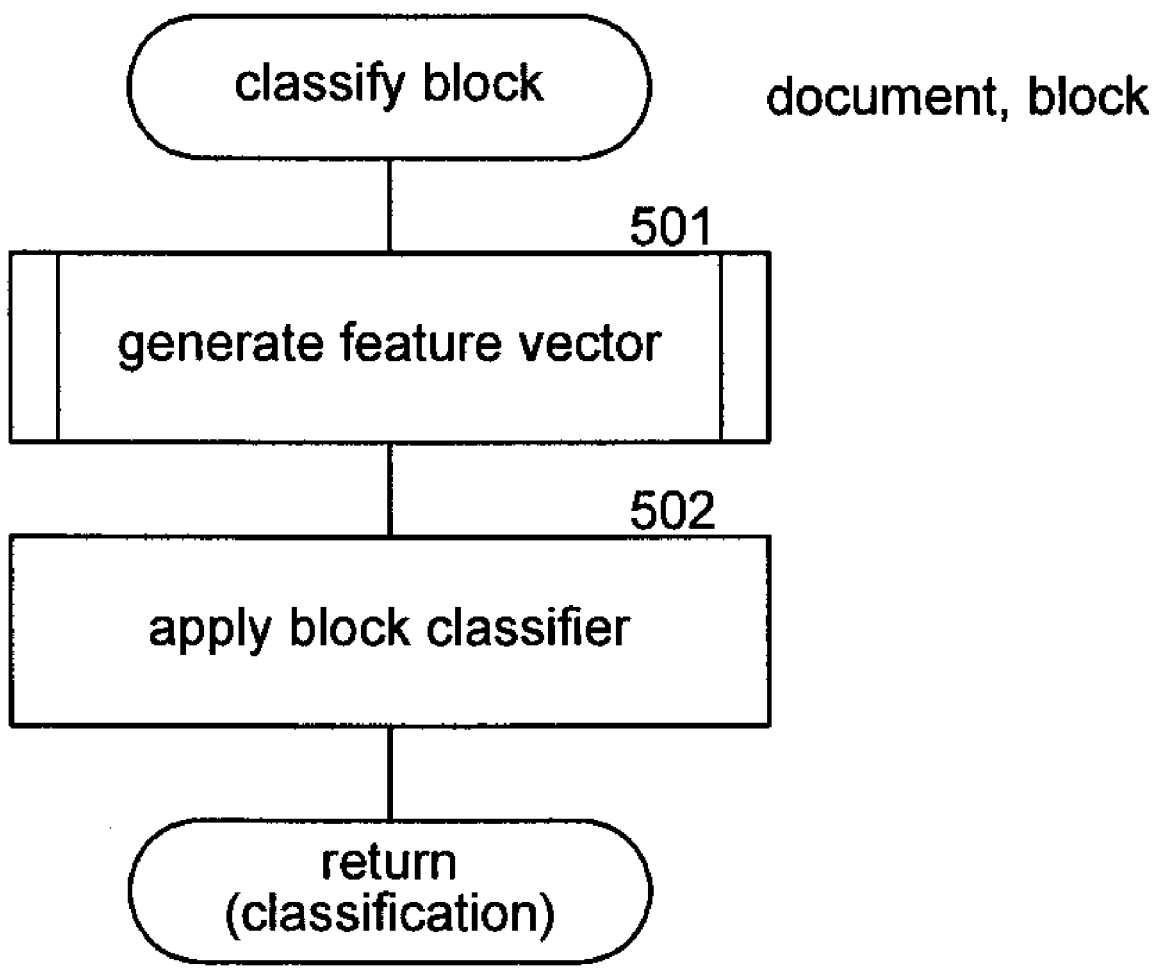
FIG. 5 is a flow diagram that illustrates the processing of the classify block component of the classification system in one embodiment.

FIG. 5 is a flow diagram that illustrates the processing of the classify block component of the classification system in one embodiment. The component is passed a web page and the block and returns a classification of the block. In block 501, the component invokes the generate feature vector component to generate the feature vector for the block. In 502, the component applies the block classifier to generate a classification for the block. The component may also identify the blocks of a web page. The component then returns the classification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing devices for classifying a block of a document based on its function, the method comprising:
    identifying blocks of training documents, a block of a document containing words that are displayed when the document is displayed;
    for each identified block,
        receiving a classification label for the identified block indicating its function; and
        generating a feature vector for the identified block, the feature vector including a linguistic feature of a word of the block;
    training a classifier using the feature vectors and classification labels to classify blocks of documents based on the feature vectors of the blocks;
    classifying a block of a document based on its function by applying the trained classifier to a feature vector for the block; and
    when a document will not fit on a display of a device, displaying blocks of the document giving preference to blocks with a certain classification.

2. The method of claim 1 wherein the linguistic feature is based on parts of speech.

3. The method of claim 2 wherein the linguistic feature includes a count of words within the text of a block for various parts of speech.

4. The method of claim 1 wherein the linguistic feature is selected from a group consisting of parts of speech, capitalization, symbols, and named entities.

5. The method of claim 1 wherein the feature vector further includes a term feature.

6. The method of claim 1 wherein the feature vector further includes a layout feature.

7. The method of claim 1 wherein the classifications include information and non-information.

8. The method of claim 1 wherein the classifications include information, interaction, navigation, advertisement, and other.

9. The method of claim 1 including displaying a document by giving preference to displaying blocks of a certain classification.

10. The method of claim 1 including displaying search results in an order that is based at least in part on analysis of blocks with a certain classification.

11. A computing device generating a classifier for classifying blocks of web pages into functional classifications, comprising:
- a training data store that includes training web pages, the web pages having blocks, a block of a web page containing text that is displayed when the web page is displayed;
- a block identification component that identifies blocks within a web page;
- a feature generation component that generates a feature vector for a block of a web page, the feature vector including layout features and linguistic features, the layout features including size of text within a block when the block is displayed;
- a labeler component that inputs a classification label for each block of each training web page;
- a component that learns coefficients of a classifier using the feature vectors of the training web pages and the label classifications and stores the coefficients in a classifier coefficients store; and
- a component that, when a web page will not fit on a display of a device, provides that the blocks of the web page are displayed giving preference to blocks with a certain classification as determined by applying the classifier with the learned coefficients to the blocks of the web page.

12. The computing device of claim 11 including a classifier component that inputs a block of a web page, generates a feature vector for the block, and classifies the block by applying a classifier with the learned coefficients to the feature vector.

13. The computing device of claim 11 wherein the linguistic feature is based on parts of speech.

14. The computing device of claim 13 wherein the linguistic feature includes a count of the parts of speech of the words within the text of a block.

15. The computing device of claim 11 wherein the linguistic feature is selected from a group consisting of parts of speech, capitalization, symbols, and named entities.

16. The computing device of claim 11 wherein the feature vector further includes a layout feature.

17. The computing device of claim 11 wherein the classifications include information and non-information.

18. A computer-readable storage medium encoded with instructions for controlling a computing device to classify blocks of web pages based on their function, by a method comprising:
- identifying blocks of training web pages, each block of a web page containing text that is displayed when the web page is displayed;
- for each identified block,
  - receiving a classification label for the identified block, the classifications including information and non-information; and
  - generating a feature vector for the identified block, the feature vector including a linguistic feature and a layout feature, the linguistic feature based on parts of speech of words within the text of the block, the parts of speech of words within the text of the block identified by submitting the text of the block to a natural language processor;
- training a classifier using the feature vectors and classification labels; and
- classifying a block of a web page as information or non-information by applying the trained classifier to a feature vector for the block
- so that when the web page will not fit on the display of a device, blocks of the web page are displayed giving preference to blocks with a certain classification.

19. The computer-readable medium of claim 18 wherein an additional linguistic feature is selected from a group consisting of capitalization, symbols, and named entities.

* * * * *